United States Patent
Wang et al.

(10) Patent No.: US 12,407,797 B2
(45) Date of Patent: Sep. 2, 2025

(54) LASER PROJECTION DEVICE AND PROJECTION DISPLAY METHOD THEREOF

(71) Applicant: HISENSE LASER DISPLAY CO., LTD., Shandong (CN)

(72) Inventors: Zhen Wang, Shandong (CN); Dabo Guo, Shandong (CN); Xianrong Liu, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 393 days.

(21) Appl. No.: 18/053,961

(22) Filed: Nov. 9, 2022

(65) Prior Publication Data
US 2023/0098832 A1    Mar. 30, 2023

Related U.S. Application Data

(63) Continuation-in-part of application No. PCT/CN2021/117099, filed on Sep. 8, 2021.

(30) Foreign Application Priority Data

Sep. 8, 2020    (CN) .......................... 202010936536.X

(51) Int. Cl.
*H04N 9/31*    (2006.01)
*H04N 9/68*    (2023.01)

(52) U.S. Cl.
CPC ......... *H04N 9/3161* (2013.01); *H04N 9/3105* (2013.01); *H04N 9/312* (2013.01); *H04N 9/68* (2013.01)

(58) Field of Classification Search
CPC ............ H04N 9/64; H04N 9/68; H04N 9/312; H04N 9/315; H04N 9/3105; H04N 9/3126;
(Continued)

(56) References Cited

U.S. PATENT DOCUMENTS

| 5,592,239 A | 1/1997 | Hara et al. |
| 2007/0216876 A1* | 9/2007 | Narikawa ............ H04N 9/3182 348/E9.027 |

(Continued)

FOREIGN PATENT DOCUMENTS

| CN | 1893599 A | 1/2007 |
| CN | 101002248 A | 7/2007 |

(Continued)

OTHER PUBLICATIONS

International Search Report, mailed Nov. 25, 2021, from PCT Application No. PCT/CN2021/117099.

(Continued)

*Primary Examiner* — Sultan Chowdhury
(74) *Attorney, Agent, or Firm* — Workman Nydegger

(57) ABSTRACT

Disclosed by the present application are a laser projection device and projection display method thereof, belonging to the technical field of laser projection. The laser projection device may comprise: a light source, a light modulation device, and a projection lens. The light source is used for providing an illumination beam. The light modulation device is used for modulating the illumination beam, at least two illumination beams being incident on at least two light-reflecting surfaces of the light modulating device, the light-reflecting surface types of the at least two light-reflecting surfaces being different, and the at least two illumination beams after modulation being of different light intensity; the projection lens is used for projecting the modulated illumination beam for imaging. The described laser projection device improves the display of the projected image.

18 Claims, 9 Drawing Sheets

(58) Field of Classification Search
CPC .. H04N 9/3152; H04N 9/3155; H04N 9/3161; H04N 9/3164; H04N 9/3182; G09G 3/002; G09G 3/346; G09G 3/2033; G03B 21/005; G03B 21/006; G03B 21/008; G03B 21/28; G03B 21/208; G03B 21/2013; G03B 21/2033; G03B 21/2053; G03B 21/2066

See application file for complete search history.

(56) References Cited

U.S. PATENT DOCUMENTS

| | | | |
|---|---|---|---|
| 2008/0204847 A1* | 8/2008 | Kamm | G02B 27/48 |
| | | | 348/E9.026 |
| 2009/0033878 A1 | 2/2009 | Shirai et al. | |
| 2009/0102988 A1 | 4/2009 | Maeda et al. | |
| 2011/0279749 A1* | 11/2011 | Erinjippurath | H04N 13/324 |
| | | | 345/32 |
| 2014/0327710 A1* | 11/2014 | Xu | G06T 3/4053 |
| | | | 345/698 |
| 2016/0261832 A1* | 9/2016 | Gorny | H04N 9/317 |

FOREIGN PATENT DOCUMENTS

| | | |
|---|---|---|
| CN | 101238735 A | 8/2008 |
| CN | 101371594 A | 2/2009 |
| CN | 102119358 A | 7/2011 |
| CN | 102239437 A | 11/2011 |
| CN | 109557660 A | 4/2019 |
| CN | 107888891 B | 4/2020 |
| WO | 2011070853 A1 | 6/2011 |

OTHER PUBLICATIONS

Chinese First Office Action, mailed Apr. 28, 2023, from China patent application No. 202010936536.X.

* cited by examiner

LASER PROJECTION DEVICE AND PROJECTION DISPLAY METHOD THEREOF

CROSS REFERENCE TO RELATED APPLICATIONS

The present application is a continuation-in-part application of International Application No. PCT/CN2021/117099, filed on Sep. 8, 2021, which claims priority of Chinese Patent Application No. 202010936536.X filed to the China National Intellectual Property Administration on Sep. 8, 2020, entitled "LASER PROJECTION DEVICE AND PROJECTION DISPLAY METHOD THEREOF", the entire contents of which are incorporated herein by reference.

FIELD

The present application relates to the field of laser projection, in particular to a laser projection apparatus and a projection display method thereof.

BACKGROUND

The laser projection apparatus projects an image on a projection screen to enable functions such as video display.

For a laser projection television, projection display involves complex light processing processes, and has a process of amplification imaging. Its core imaging component is a laser valve component, which is different according to the applied projection architecture: for example, in the DLP architecture, the laser valve is a reflecting laser valve component; in the LCOS projection architecture, the laser valve may be three LCOS liquid crystal laser valves. The laser valve receives a drive signal and modulates a beam. The outgoing beam is a beam carrying an image signal and becomes an image beam, which can be projected into an image picture.

The source of the laser projection television is always luminous, which can emit beams of three primary colors at the same time or in a sequential manner. The beam emitted from the source is irradiated to the laser valve of the laser projection television after a series of homogenization and shaping processes, modulated, and projected into an image through the projection lens.

Therefore, the source of the laser projection is always output for illumination in accordance with a certain beam size and the overall beam, so the source cannot be partitioned.

In the related art, in order to improve the display effect of the image projected by the laser projection apparatus, the laser projection apparatus needs to process the image before projecting the image. For example, some algorithms are used to weight the gray scale value of the image to adjust the brightness of the local area of the image, so as to expand the gray scale difference in the image and enhance the contrast of the image, thus making the image projected later clearer.

However, in the process of image processing by the laser projection apparatus to enhance the image contrast, it is very easy to cause image distortion due to excessive image processing. For example, if it is assumed that the gray scale values of some pixels in the image are distributed between 200 and 240, after the current laser projection apparatus processes the image, it is highly possible to process the gray scale values of these pixels to 256, causing image distortion. Therefore, the current laser projection apparatus has a poor effect on image processing to enhance the image contrast, resulting in a poor display effect of subsequent projected images.

SUMMARY

In one aspect of an embodiment of the present application, provided is a laser projection apparatus, including: a source, configured for providing a plurality of illumination beams; a dimming system, configured for performing beam shaping and modulating for the plurality of illumination beams, wherein at least two illumination beams of the plurality of illumination beams after being modulated are of different light intensities; and; and a projection lens, configured for projecting the plurality of illumination beams after being modulated into an image.

In another aspect, provided is a projection display method of the laser projection apparatus, the method being applied to the laser projection apparatus and including: emitting, by the source, the plurality of illumination beams; performing beam shaping and modulating, by the dimming system, for the plurality of illumination beams, wherein at least two illumination beams of the plurality of illumination beams after being modulated are of different light intensities; and projecting, by the projection lens, the plurality of illumination beams after being modulated into an image.

Provided is a projection display method of the laser projection apparatus, the method being applied to the laser projection apparatus and including: acquiring an image signal of an image to be projected; obtaining an image partition and a primary color component signal of the image to be projected based on the image signal of the image to be projected, and driving a light modulation device to modulate illumination beams provided by a source, wherein, at least two beams in the illumination beams modulated by the light modulation device are of different light intensities; and projecting the modulated illumination beams into the image by a projection lens.

BRIEF DESCRIPTION OF THE DRAWINGS

In order to more clearly illustrate the schemes in the embodiments of the present application, the accompanying drawings used in the description of the embodiments will be briefly described below, and it will be apparent that the drawings in the following description are merely some embodiments of the present application and that other drawings can be derived from these drawings without creative effort by those of ordinary skill in the art.

DETAILED DESCRIPTION OF THE EMBODIMENTS

In order to make the objectives, technical schemes and advantages of the present application clearer, the embodiments of the present application will be described in further detail below with reference to the accompanying drawings.

Figure 1A:
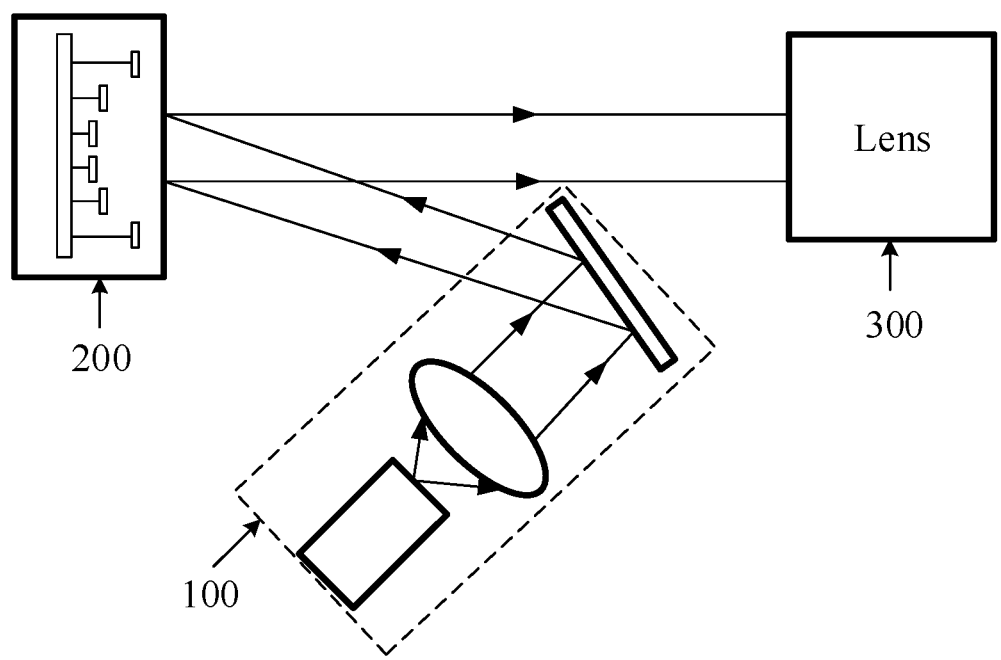
FIG. 1A is a structural schematic diagram of a laser projection apparatus provided by an embodiment of the present application.
Figure 1B:
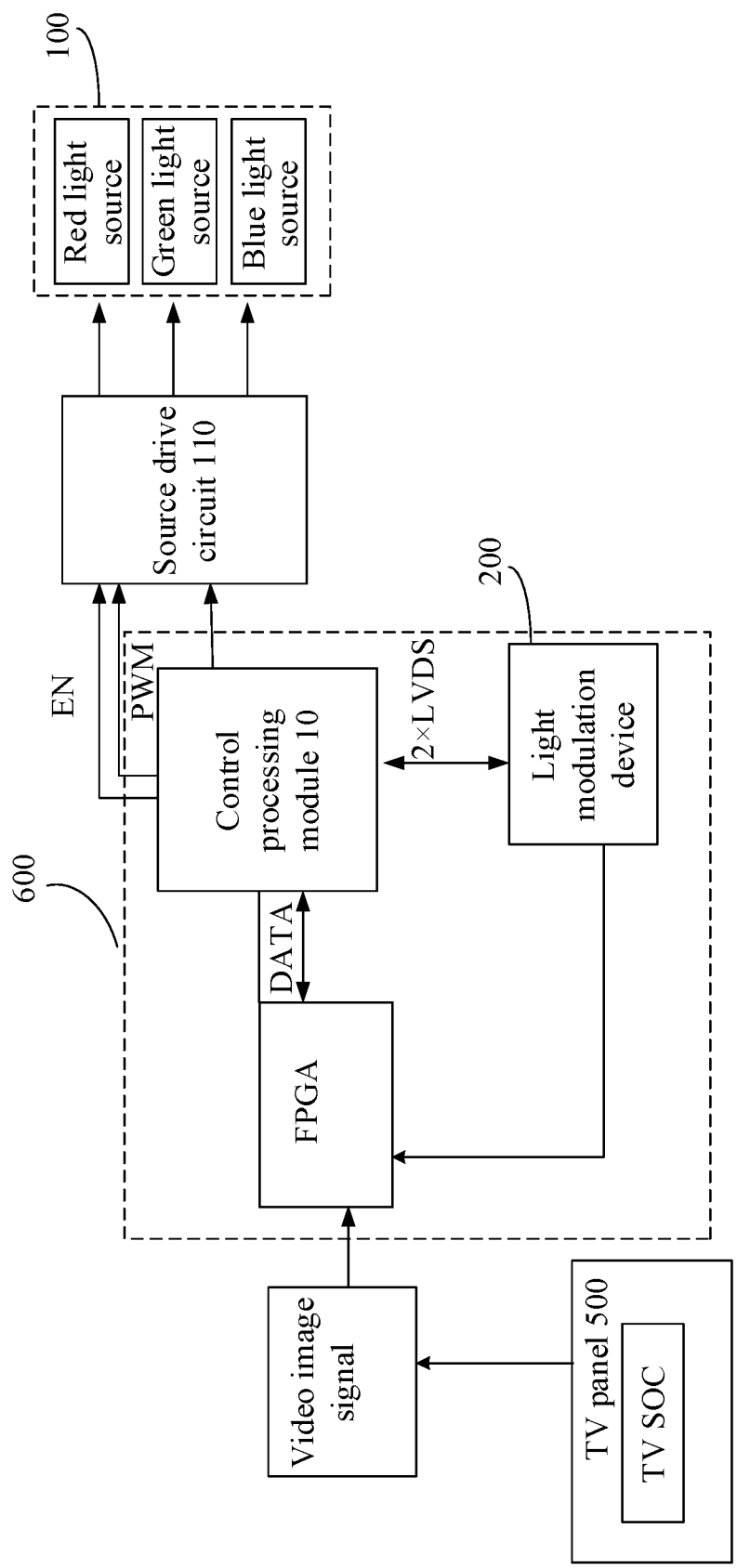
FIG. 1B is a schematic diagram of a circuit structure of the laser projection apparatus provided by an embodiment of the present application.

Referring to FIG. 1A and FIG. 1B, a structural schematic diagram of a laser projection apparatus is provided by an embodiment of the present application. The laser projection apparatus 00 may include a source 100, a light modulation device 200 and a projection lens 300.

The source 100 is configured for providing illumination beams, and the source 100 may be a laser source. In an embodiment of the present application, the illumination beams provided by the source 100 have at least two beams, the illumination beams provided by the source 100 are shaped and homogenized beams with uniform intensity distribution, and the illumination beams are directed towards the light modulation device 200.

The light modulation device 200 is configured for modulating the illumination beams provided by the source 100. The illumination beams provided by the source 100 can generally be regarded as a whole and are incident on the light modulation device 200 at a preset angle.

However, since the light modulation device 200 has at least two light-reflecting surfaces with different reflecting surface types during operation, illumination beams incident on a light reflecting surface may be referred to as one beam. Thus, the illumination beams provided by the source 100 may be considered to be composed of a plurality of illumination beams. The illumination beams incident on the at least two light-reflecting surfaces with different reflecting surface types can also change their respective intensity distribution while being modulated into image beams such that the intensities of the modulated at least two illumination beams are different.

Besides, the illumination beams modulated by the light modulation device 200 are directed towards the projection lens 300. The projection lens 300 is configured for projecting the illumination beams modulated by the light modulation device 200 into an image and the image may be presented on a projection screen. It should be noted that the image projected by the projection lens 300 is the image to be projected.

The light modulation device 200 includes a plurality of light modulation units, and each light modulation unit includes a light modulation mirror and a drive assembly. The drive assembly is configured for moving the corresponding light modulation mirror in a direction perpendicular to a reflecting surface of the light modulation mirror to change the height of the reflecting surface of the light modulation mirror and further configured for driving the reflecting surface of the light modulation mirror to generate angle deflection to change included angles between the incident illumination beams and the reflecting surfaces of the light modulation mirrors to reflect the incident illumination beams in different directions.

Figure 11A:
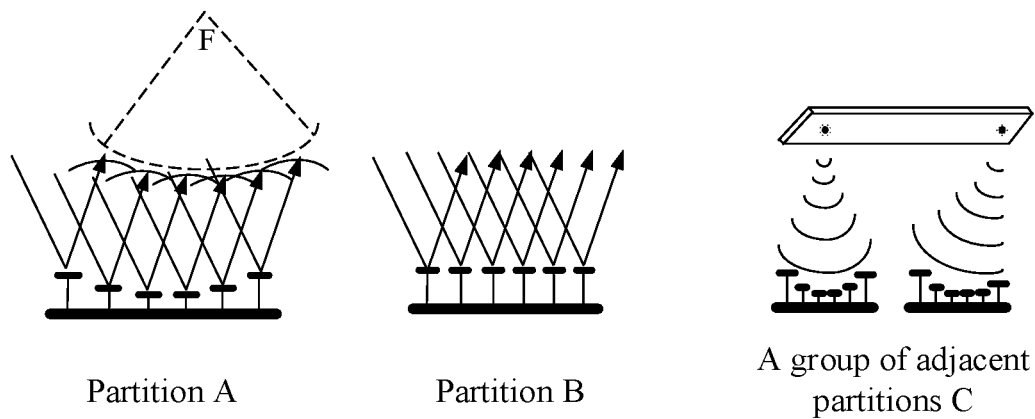
FIG. 11A is a schematic diagram of a partition operation state of the light modulation device provided by an embodiment of the present application.

The right figure of FIG. 11A shows a reflection light path of a group of adjacent partitions C. The group of adjacent partitions are two light-reflecting surfaces, and each light reflecting surface includes reflecting surfaces of a plurality of light modulation mirrors. Due to different driving states of drive assemblies corresponding to the light modulation mirrors for the light modulation mirrors, the heights and deflection angles of the plurality of light modulation mirrors in each of the above two light-reflecting surfaces are different, thus forming different reflecting surface types. Different reflecting surface types make the treatment for the illumination beam incident on the reflecting surface different. Specifically, the light path of the plurality of light rays of the illumination beam changes, and the reflection angles are different.

In an implementation, the light modulation device 200 controls a position at which the plurality of light modulation mirrors are moved in a direction perpendicular to the reflecting surfaces of the light modulation mirrors according to a brightness signal of an image to be projected. The light modulation device 200 controls the deflection of the plurality of light modulation mirrors according to a component signal of the image to be projected.

The brightness signal of the image to be projected includes image partitions obtained according to the gray scale value after the brightness distribution of the image to be projected is counted. Each partition corresponds to one illumination beam. In addition, the brightness signal further includes a compensation signal of the brightness of different partitions or a change signal of the brightness of different partitions, so that it can be used to specifically control the change degree of the light intensity of the light modulation partitions corresponding to different beams by the light modulation device.

Hence, according to the partitions of the image to be projected, the illumination beams may correspondingly also be divided into a plurality of beams.

Since the size of each partition in the image to be projected may be different, the luminous flux sizes of the plurality of beams in the illumination beams may also be different.

If the partitions in the image to be projected are distributed in regular rows and columns, a plurality of beams of the illumination beams may also be arrayed in a plurality of rows and a plurality of columns.

For example, the plurality of beam partitions may be arrayed in three rows and three columns, in which case the illumination beams have nine beam partitions. For another example, the plurality of beam partitions may be arrayed in two rows and two columns, in which case the illumination beams have 4 beam partitions.

Besides, the image component signals of the image to be projected include R, G, and B component image signals obtained by dividing the image to be projected according to R, G, and B three primary colors. The control circuit of the projection device may decompose one color image into three primary color component images. The signal of each primary color component image is converted into a corresponding drive signal to cause the light modulation device 200 to modulate the beam irradiated thereon, the modulated beam being an image beam, which can be projected into an image through the projection lens.

In the embodiments herein, the image to be projected may have a plurality of image partitions, and the plurality of image partitions may be in one-to-one correspondence with the plurality of beam partitions in the illumination beams. The light modulation device 200 has corresponding light modulation partitions corresponding to the plurality of image partitions described above, each light modulation partition includes at least one light modulation unit, each light modulation partition corresponds to one illumination beam, and each light modulation partition has one light reflecting surface.

The light modulation device 200 may modulate the illumination beam prior to incidence into the light modulation device 200, so that the light intensities within at least two illumination beams of the illumination beam modulated by the light modulation device 200 are made different, so that the difference between the brightness of at least two image partitions corresponding to the at least two beam partitions in the image to be projected can be enlarged, thereby effectively increasing the dynamic contrast of the image to be projected. The dynamic contrast refers to the brightness ratio between the brightest part and the darkest part in the image to be projected.

For example, the at least two illumination beam partitions include a first beam partition and a second beam partition, and it is assumed that the brightness of a first image partition corresponding to the first beam partition in the image to be projected is less than the brightness of a second image partition corresponding to the second beam partition. After the light modulation device 200 performs light modulation on the illumination beams, the light intensity of the first beam partition may be less than the light intensity of the second beam partition. As such, the light rays within the first beam partition are converted to enable darker brightness of the first image partition after passing through the light modulation device 200 and the projection lens 300, while the light rays within the second beam partition are converted to enable brighter brightness of the second image partition after passing through the light modulation device 200 and the projection lens 300. In this case, the dynamic contrast of the image to be projected may be improved without changing the luminous brightness of the source 100 and without processing the image to be projected.

In an embodiment, the image brightness signal can be acquired first for the image to be projected in real time, and an image partition and brightness adjustment signal is converted into a drive signal and output to the light modulation device, and an image component signal of the image to be projected, that is, the RGB three-primary color component image signal is also converted into a drive signal, to drive the light modulation device to modulate the illumination beam, the image beam is generated, and the image beam is ultimately projected into the projected picture, in such way, the regular modulation of the image beam can be performed while adjusting the contrast of the projected image picture partition in real time.

In other embodiments, the brightness signal of one or more frames of the image to be projected can also be acquired at the same time and partitioning is performed accordingly. Correspondingly, the light modulation device can also be partitioned accordingly to change beam brightness in different partitions. In this way, after the image is projected, since the picture changes in consecutive frames are small, the image partition and brightness change signal of the previous frame or frames can still be used, therefore, the change of the projected image contrast is applied to the subsequent image to be projected, and the display effect of the subsequent image to be projected through the projection lens can also be improved.

In embodiments of the present application, the laser projection apparatus also includes a control unit. In one specific implementation, the control unit processes an input video image signal to obtain an image brightness signal and an image component signal of the image to be projected, and sequentially transmits the image brightness signal and the image component signal of the image to be projected to the light modulation device to drive the light modulation device in a signal driving manner. The image brightness signal and the image component signal can be obtained by analyzing and distributing the image, and then transmitted to the light modulation device in turn. Alternatively, in another specific implementation, the control unit converts an input video image signal into a drive signal of the light modulation device, which is related to both the image brightness signal and the image component signal of the image to be projected. In this way, the control unit can perform analytical processing on the video image signal, and simultaneously acquire two kinds of signals, i.e. the image component signal and the image brightness signal. The two kinds of signals can be transmitted to the light modulation device in a signal mixing or superimposing form. After receiving the signal, the light modulation device can decompose the signal into the image brightness signal and the image component signal, and control the up and down movement of the drive assembly in each light modulation unit, as well as the deflection or rotation of the drive assembly.

FIG. 1B is a schematic diagram of a circuit structure of the laser projection apparatus as shown in FIG. 1A. In the circuit structure schematic diagram of the present embodiment, the control unit of the laser projection apparatus mentioned previously may include a plurality of circuit blocks as follows, for instance, the control unit may include a display panel 600, and a TV panel 300. The laser projection apparatus includes a source 100, a display panel 600, a TV panel 300, and a light modulation device 200.

A control processing module 10 is arranged on the display panel 600 of the laser projection apparatus. The light modulation device 200 may also be arranged on the display panel 600.

In particular, the source 100 includes a red light source, a blue light source, and a green light source, and the sources of three colors may emit light simultaneously or sequentially.

The source 100 receives the control of the control processing module 10 on the display panel 600, the control processing module 10 outputs a current PWM brightness adjustment signal and an enable control signal EN, to control timing and lighting of the source 100 through a source drive circuit 110.

The TV panel 500 is mainly configured for external audio video signals and decoding. A System on Chip (SoC) is arranged on the TV board module 500, capable of decoding data in different data formats into a normalized format, and transmitting data in the normalized format to a display panel through, for example, a connector.

The TV panel 500 outputs a video image signal to the display panel 600. The display panel 600 is provided with a Field Programmable Gate Array (FPGA) configured for processing the input video image signal, such as MEMC frequency multiplication processing, correction of the image, or the like for implementation of an image enhancement function. The display panel 600 is further provided with a control processing module 10, and the control processing module 10 is connected with the algorithm processing module FPGA and is configured for receiving the processed data of the video image processing signal as data of the image to be projected.

In one embodiment, the light modulation device 200 may receive a video image signal output by the TV panel 500 and analyze the video image signal to acquire a partition brightness signal of the video image and an image component of the video image.

In further embodiments, the light modulation device 200 may receive an image signal to be projected output by the processing module FPGA on the display panel 600, where the image signal to be projected may include an image brightness signal and an image component signal.

The display panel 600 mainly includes the control processing module 10, the light modulation device 200 and the FPGA. The control processing module 10 may directly receive a video image signal output by the TV panel 500 (when there is no FPGA) or may receive an image signal to be projected after FPGA processing, and the image signal to be projected may include an image component signal or not. The control processing module 10 may generate a modulated drive signal for driving the light modulation device 200 directly with the video image signal, or may convert the video image signal into a modulated drive signal for driving the light modulation device 200 by a drive chip corresponding to the light modulation device 200.

In an implementation, if the laser projection apparatus employs a DLP projection architecture, the control processing module 10 may in particular be a DLP master chip and the light modulation device 200 may in particular be a DMD digital micromirror array.

The laser projection apparatus provided by the above embodiments of the present application includes a source, a light modulation device, and a projection lens. The light modulation device can modulate the illumination beams provided by the source on the basis of the image signal of the image to be projected, the light intensities of at least two illumination beams in the illumination beams modulated by the light modulation device are different such that the light intensity distribution of the illumination beams is also changed while the illumination beams are modulated into an image beam, thereby increasing the display effect of the projected image, such as increasing the contrast of the projected image.

In order to more clearly illustrate the operation of the light modulation device, image beam modulation and light intensity distribution modulation of the incident illumination beam by the light modulation device will now be described.

It should be noted that the two processes, while introduced separately, can be done at once, or the two processes can be done separately when implemented.

The structural composition of the light modulation device is first described below.

Figure 2A:
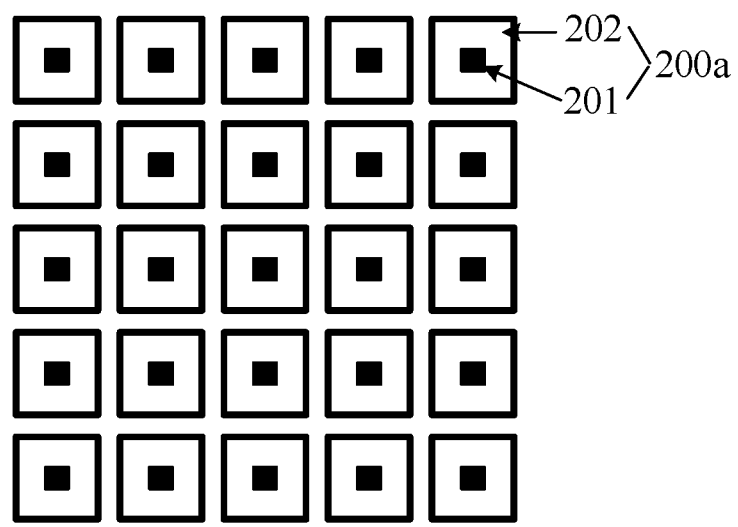
FIG. 2A is a top structural diagram of a light modulation device provided by an embodiment of the present application.
Figure 2B:
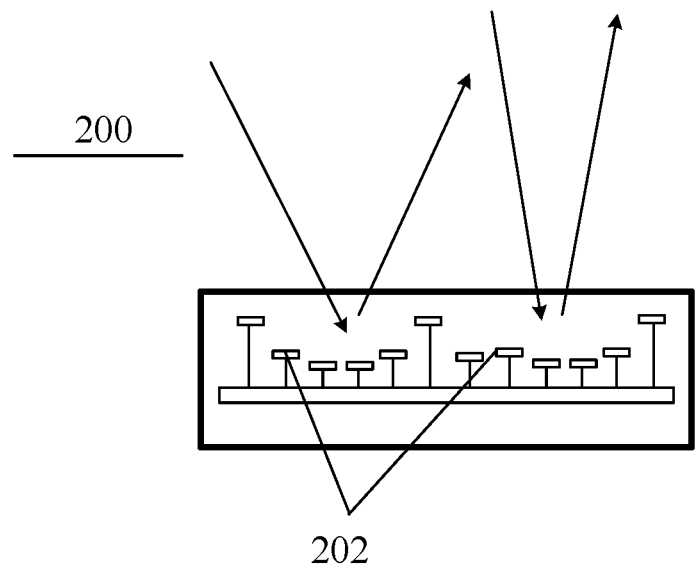
FIG. 2B is a side structural diagram of the light modulation device provided by an embodiment of the present application.

In one implementation, please refer to FIG. 2A and FIG. 2B, FIG. 2A is a top structural diagram of the light modulation device provided by an embodiment of the present application, and FIG. 2B is a side structural diagram of the light modulation device in a working state provided by an embodiment of the present application.

As shown in FIG. 2B, the light modulation device 200 has a light reflecting surface including a plurality of light modulation mirrors 202. Each light modulation mirror 202 reflects light. The light modulation device 200 further has a plurality of drive assemblies corresponding to the plurality of light modulation mirrors 202. Each drive assembly is configured for changing a relative height position between the light modulation mirrors to form a non-planar light reflecting surface. There is a difference in height among the plurality of light modulation mirrors 202 as shown in FIG. 2B, such that the entire light reflecting surface is not a plane, but rather appears locally concave, or locally convex.

As shown in FIG. 2A, the light modulation device 200 may include a plurality of drive assemblies 201, and a plurality of light modulation mirrors 202 connected in one-to-one correspondence with the plurality of drive assemblies 201, in particular the light modulation mirrors 202 are reflectors. In this light modulation device 200, each drive assembly 201, and the mirror 202 correspondingly connected to the drive assembly 201 can constitute a light modulation unit 200a. As such, the light modulation device 200 may include a plurality of light modulation units 200a. In an embodiment of the present application, the plurality of light modulation units 200a in the light modulation device 200 may be arrayed in a plurality of rows and a plurality of columns. For example, the plurality of light modulation units 200a may be arrayed inn rows and n columns, in which case the light modulation device 200 includes $n^2$ light modulation units 200a.

In the present embodiment, each drive assembly 201 in the light modulation device 200 is configured for driving the corresponding light modulation mirror 202 to move in a direction perpendicular to the reflecting surface of the light modulation mirror 202. When different light modulation mirrors 202 move to different positions in a direction perpendicular to the reflecting surface of the light modulation mirror 202 under the action of their corresponding drive assemblies 201, if the illumination beams are directed at the light modulation mirrors 202 in different positions in the direction perpendicular to the reflecting surface, the phases of the light rays reflected by the light modulation mirrors 202 in different positions are different.

In this case, the light modulation device 200 can adjust the position of each of the light modulation mirrors 202 in the direction perpendicular to the reflecting surface of the light modulation mirror 202 by the plurality of drive assemblies 201 based on the image signal of the image to be projected such that the phases of at least some of the light rays passing through each of the light modulation mirrors 202 in the light modulation device 200 are different. As such, coherent or destructive interference may occur between the illumination beams reflected by the respective light modulation mirrors 202, which may result in different light intensities within at least two beam partitions of the illumination beams modulated by the light modulation device 200.

Specifically, during operation of the light modulation device 200, for the whole component, the light reflecting surface of the surface is non-planar and the non-planar light reflecting surface is at least partially concave in surface to form a concave mirror, which allows the beams to assume a certain convergent state, and coherent interference between different beams occurs, which can increase the brightness, i.e. the light intensity, of the corresponding beam partition. Alternatively, the non-planar light reflecting surface is at least partially convex in surface to form a convex mirror which allows the beams to assume a certain diverging state, destructive interference occurs between different beams, or beams are directed to other partitions, which can reduce the brightness of the present beam partition and increase the brightness of an adjacent beam partition.

As an example, according to the brightness distribution, the image to be projected is divided into a plurality of image partitions, and the plurality of image partitions have a mapping relationship with the partitions of the light modulation device 200.

The light modulation device 200 includes a plurality of light modulation partitions in one-to-one correspondence with the plurality of beams and also in one-to-one correspondence with the plurality of image partitions. Each light modulation partition includes at least one light modulation mirror. The light-reflecting surfaces of the at least one group of two adjacent light modulation partitions differ in surface type, thereby facilitating different light path changes to the beams by the adjacent partitions, realizing phase modulation, and ultimately changing the light intensity distribution of the at least one group of two adjacent light modulation partitions.

The image brightness signal of the image to be projected may include brightness signals of respective image partitions in the image to be projected. The light modulation device 200 may have at least two light modulation partitions in one-to-one correspondence with the at least two beam partitions, each light modulation partition has a plurality of light modulation units 200a therein, i.e. the area in which the plurality of light modulation units 200a in the light modulation device 200 are located may be divided into the at least two light modulation partitions. In the present application, each beam partition of the illumination beams may be reflected by the respective light modulation mirrors 202 within the corresponding light modulation partition of the light modulation device 200 and then passes through the light modulation device 200 and the projection lens 300 to correspond to a partition of the projected display image.

The light modulation device 200 is configured for, based on the brightness signals for the respective image partitions in the image to be projected, adjusting, by the respective drive assemblies 201 within the first light modulation partition, the position of the respective light modulation mirrors 202 within the first light modulation partition to cause coherent interference of at least part of the light rays within the first beam partition after being reflected by the light modulation mirrors 202 within the first light modulation partition; and adjusting, by the respective drive assemblies 201 within the second light modulation partition, the position of the respective light modulation mirrors 202 within the second light modulation partition to cause destructive interference of at least part of the light rays within the second beam partition after being reflected by the light modulation mirrors 202 within the second light modulation partition.

In the image to be projected, the brightness of the first image partition corresponding to the first beam partition is greater than the brightness of the image partition corresponding to the second beam partition.

In this application, since the brightness of the first image partition in the image to be projected is greater than the brightness of the second image partition, the light modulation device 200 can cause coherent interference of a portion of light rays in the first beam partition reflected by the light modulation minors 202 in the first light modulation partition by adjusting the position of each light modulation mirror 202 in the first light modulation partition, therefore, the light intensity of the first beam partition can be improved. In addition, the light modulation device 200 can also adjust the position of each light modulation mirror 202 in the second light modulation partition, so that a portion of the light rays in the second light modulation partition reflected by the light modulation mirrors 202 within the second light modulation partition can undergo destructive interference, thus reducing the light intensity of the second light modulation partition. In this way, after the light rays in the first beam partition pass through the light modulation device 200 and the projection lens 300, the brightness of the converted first image partition is brighter; after the light rays in the second beam partition pass through the light modulation device 200 and the projection lens 300, the brightness of the converted second image partition is darker, thus effectively improving the dynamic contrast of the image to be projected.

In the present embodiment, the light modulation device 200 essentially belongs to a phase modulator. The phases of the light rays reflected by each of the light modulation mirrors 202 of the light modulation device 200 are adjusted by the light modulation device 200 such that the light rays within the illumination beams modulated by the light modulation device 200 may interfere coherently or destructively, and the light intensities of the two beam partitions present in the illumination beams are different.

In connection with the above embodiments, the light modulation device 200 needs to acquire brightness signals of various image partitions in the image to be projected before light modulation on the illumination beams provided by the source 100. In order to allow the light modulation device 200 to quickly acquire the brightness signal of each image partition, the embodiments of the present disclosure may determine the brightness signal of each image partition in the following manner.

Figure 3:
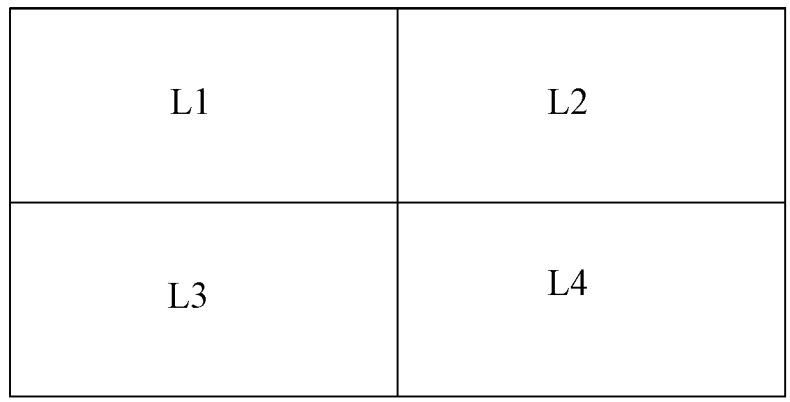
FIG. 3 is a schematic diagram of an image to be projected provided by an embodiment of the present application.

Referring to FIG. 3, FIG. 3 is a schematic diagram of an image to be projected provided by an embodiment of the present application. For simplicity of illustration, the image to be projected is divided into four image partitions, i.e. an image partition L1, an image partition L2, an image partition L3, and an image partition L4, respectively. It is assumed again that the laser projection apparatus is capable of projecting an image with a resolution of 1920×1080. Then, the positions of respective pixels within the image partition L1 can be represented as: (0, 0)-(959, 539); the positions of respective pixels within the image partition L2 can be represented as: (959, 0)-(1919, 539); the positions of respective pixels within the image partition L3 can be represented as: (0, 1079)-(959, 1079); and the positions of respective pixels within the image partition L4 can be represented as: (960, 540)-(1919, 1079).

For each image partition, first, the numbers of pixels located within respective gray scale intervals may be counted based on the gray scale values of respective pixels within the image partition. Thereafter, the brightness signal of the image partition may be determined according to the respective gray scale intervals and the numbers of pixels located within the respective gray scale intervals.

Figure 4:
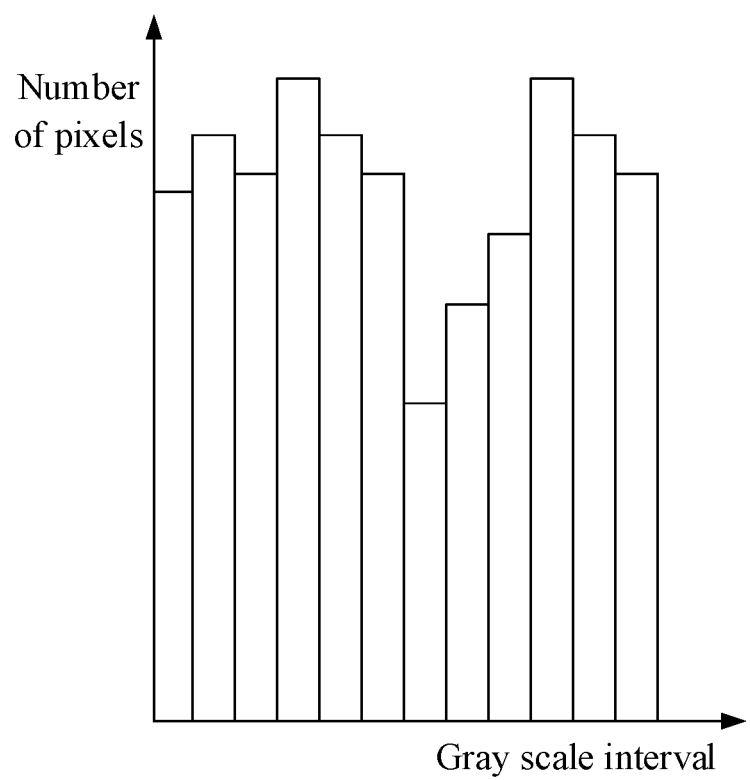
FIG. 4 is a gray scale histogram provided by an embodiment of the present application.

As an implementation, referring to FIG. 4, which is a gray scale histogram in accordance with an embodiment of the present application. The horizontal coordinate represents the respective gray scale intervals, and the vertical coordinate represents the numbers of pixels located within the respective gray scale intervals of gray values. When determining the brightness signal of the image partition, a median value of each gray scale interval may be multiplied by the number of pixels having a gray scale within the gray scale interval, and the respective obtained values may be added to obtain a value, and the value obtained by addition may be used to represent the brightness signal of the image partition.

It should be noted that since each pixel includes a red sub-pixel, a green sub-pixel and a blue sub-pixel, in order to determine the gray scale value of each pixel, the largest gray scale value among the gray scale value of the red sub-pixel, the gray scale value of the green sub-pixel and the gray scale value of the blue sub-pixel can be determined as the gray scale value of the pixel.

After the light modulation device 200 acquires the brightness signal of each image partition in the image to be projected by the above-described implementation, the light modulation device 200 may control the position of each of the light modulation mirrors 202 via the drive assembly 201 such that the light intensities within at least two beam partitions of the illumination beams modulated by the light modulation device 200 are different, thereby expanding the difference between the brightness of at least two image partitions corresponding to the at least two beam partitions.

Figure 5:
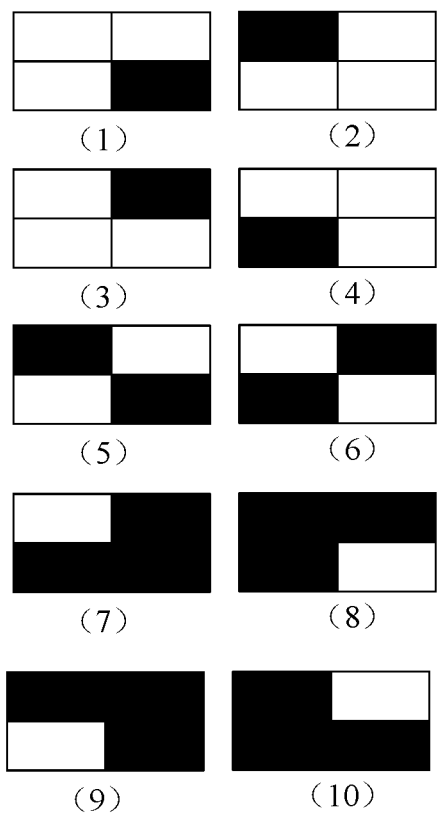
FIG. 5 is a schematic diagram of 10 light modulation situations existing in the image to be projected shown in FIG. 3.

In the embodiments of the present application, for each image partition of the image to be projected shown in FIG. 3, there are 10 situations where light modulation is required. Referring to FIG. 5, FIG. 5 is a schematic diagram of 10 light modulation situations existing in the image to be projected shown in FIG. 3. In FIG. 5, (1) to (10) respectively represent location distribution diagrams of the image partitions that need to be lightened and darkened in the image to be projected. In FIG. 5, the white partition in the image to be projected represents the image partition with higher brightness, and the black partition represents the image partition with lower brightness. In the present application, the light intensity of the beam partition corresponding to the image partition with higher brightness can be increased through the light modulation device, making the image partition with higher brightness brighter, and the light intensity of the beam partition corresponding to the image partition with lower brightness can be reduced, making the image partition with lower brightness darker.

Since the light modulating device 200 can adjust the phase of the light ray in the illumination beam by adjusting the position of each light modulation mirror 202 in the direction perpendicular to the reflecting surface of the light modulation mirror 202, and the light modulating device 200 will only adjust the light intensity in each beam partition in the illumination beams. Therefore, for the 10 light modulation situations of the image to be projected shown in FIG. 5, the position of each light modulation mirror 201 in the light modulation device 200 can be determined in each light modulation situation before the laser projection apparatus leaves the factory. In this way, after the laser projection apparatus leaves the factory, when the laser projection apparatus needs to display the image to be projected, it can directly determine which light modulation condition the image to be projected belongs to, based on the brightness signal of each image partition in the image to be projected, and control each light modulation mirror 201 in the light modulation device 200 to move to a corresponding position to improve the contrast of the image to be projected.

The following embodiment takes the position distribution of the image partitions that need to be lightened and darkened in the image to be projected shown in (1) of FIG. 5 as an example, and gives a schematic description for determination of the position of each light modulation mirror 201 in the light modulation device 200.

In (1) of FIG. 5, if the light modulation device 200 is not used, before entering the light modulation device 200, the light intensities of the four beam partitions corresponding to the four image partitions are the same, and the light energy distribution of the four beam partitions is also the same. For example, if the total light energy of the illumination beams provided by the source 100 is A, the light energy of each of the four beam partitions is A/4.

In (1) of FIG. 5, if the light modulation device 200 is required, before entering the light modulation device 200, the light intensities of at least two beam partitions in the four beam partitions corresponding to the four image partitions are different, and the light energy distribution of the at least two beam partitions is also different.

For this modulation situation shown in (1) of FIG. 5, the size of light energy in each image partition can be manually specified. For example, it can be assumed that the total light energy of the beams provided by the source 100 is A, it can be artificially specified that the light energy of each of the three image partitions with higher brightness in FIG. 5 (1) is greater than A/4, and the light energy of one image partition with lower brightness in FIG. 5 (1) is less than A/4. It is only necessary to ensure that the total light energy of the four beam partitions in (1) of FIG. 5 is A.

In this way, the amplitude and phase of the light rays at each position in the illumination beams modulated by the light modulation device 200 can be obtained by light simulation. In this situation, the light wave function of the illumination beam after light modulation by the light modulation device 200 is:

$$g = B(x, y)\exp[i\varphi_1(x, y)].$$

$B(x, y)$ represents the amplitude distribution of the illumination beam after light modulation by the light modulation device 200; $\varphi_1(x, y)$ represents the phase distribution of the illumination beam after light modulation by the light modulation device 200; $(x, y)$ represents the position of each light modulation unit 200a in the light modulation device 200. Since $B(x, y)$ and $\varphi_1(x, y)$ are both known quantities, the light wave function g is also a known quantity.

Once the structure of the source 100 is determined, the amplitude and phase of the light rays at each position in the illumination beams provided by the source 100 can be determined. In this situation, a light wave function of the illumination beams provided by the source 100 is:

$$f = A(x, y)\exp[i\varphi_2(x, y)].$$

$A(x, y)$ represents the amplitude distribution of the illumination beams provided by the source 100; $\varphi_2(x, y)$ represents the phase distribution of the illumination beams after light modulation by the light modulation device 200. Since $A(x, y)$ and $\varphi_2(x, y)$ are both known quantities, the light wave function f is also a known quantity.

Since the light modulation device 200 belongs to a phase modulator, which is capable of adjusting the phase of the illumination beam provided by the source, the phase distribution required for adjustment by the light modulation device 200 can be deduced by a light wave function g and a light wave function f. In this way, the position of each of the light modulation mirrors 202 in the light modulation device 200 in a direction perpendicular to the reflecting surface of the light modulation mirror 202 can be determined according to the phase distribution that needs to be adjusted by the light modulation device 200.

In an implementation, based on the light wave function g and the light wave function f, the phase distribution that needs to be adjusted by the light modulation device 200 can be determined by the Gerchberg-Saxton (GS) phase retrieval algorithm.

The following condition is satisfied for the light wave function g and the light wave function f:

$$f=F(g), g=F^{-1}(f).$$

wherein, F represents the Fourier transform, i.e. after Fourier transform is performed on the light wave function f, the light wave function g can be obtained; $F^{-1}$ represents the inverse Fourier transform, i.e. after inverse Fourier transform is performed on the light wave function g, the light wave function f can be obtained.

As such, the procedure of the GS phase retrieval algorithm is as follows: a number of phase iteration processes are performed on the light wave function f until after the iteration conditions are met, the phase distribution output at the last time is determined as the phase distribution that needs to be adjusted by the light modulation device 200. Each iterative process may include the following operations.

S1, Fourier transform is performed on the light wave function f=Aexp(iφ) to obtain a light wave function g'=B'exp(iφ).

S2, the amplitude B' in the light wave function g'=B'exp (iφ') is replaced by the amplitude B, Fourier transform is performed on the light wave function g'=B'exp(iφ') to obtain a light wave function f'=A'exp(iφ').

S3, the amplitude A' in the light wave function f'=A'exp (iφ') is replaced by the amplitude A, the Fourier transform process in S1 is performed on the light wave function f'=A'exp(iφ') to output a corresponding phase distribution.

In an embodiment of the present application, after repeating the above phase iteration process of S1 to S3 a plurality of times, the last output phase distribution may be determined as the phase distribution that needs to be adjusted by the light modulation device 200 if the iteration condition is satisfied.

The iterative condition may be that the difference between the phase φ' in the light wave function g' and the phase φ in the light wave function g is less than a preset threshold, and the difference between the phase φ' in the light wave function f' and the phase φ in the light wave function f is less than a preset threshold.

It should be noted that the above embodiments give an exemplary description of the light intensity distribution modulation principle of the light modulation device 200.

FIG. 11A shows the schematic diagram of the phase change effect of different partitions of the light modulation device on the corresponding beams of the partitions. As shown in the left figure of FIG. 11A, it is the schematic diagram of the side section of one modulation partition A. In this partition, by controlling the moving positions of light modulation mirrors, the plurality of light modulation mirrors form different heights, thus forming a non-planar reflecting surface. In this implementation, the light reflecting surface of the first modulation partition A is a concave surface, so that different beams can be converged, interference can occur in a short optical path, and the brightness in this partition can be improved.

As shown in the middle figure of FIG. 11A, which is the side section diagram of one modulation partition B, in this partition, the moving positions of the plurality of light modulation mirrors are the same, that is, the brightness distribution of the partition is not changed, but a mirror or plane reflection is formed.

As shown in the right figure of FIG. 11A, it is a schematic diagram of the side section of a group of adjacent partitions C. In this group of adjacent partitions, the plurality of light modulation mirrors in these two partitions form reflecting surfaces of different surface types. Therefore, the optical path changes of the beams reflected by the reflecting surfaces in the different partitions are different, and the phase changes are also different. Coherent or destructive interference will occur at different positions in space, and the amplitude and intensity of the beams will change, and eventually, the light intensities of the lighting beams in the adjacent partitions will change, thus improving the contrast of different areas according to the different image display contents of an image.

The following embodiment will explain the principle of adjusting the positions of the light modulation mirrors 202 in the direction perpendicular to their reflecting surfaces by the drive assemblies 201 in the light modulation device 200.

Figure 6:
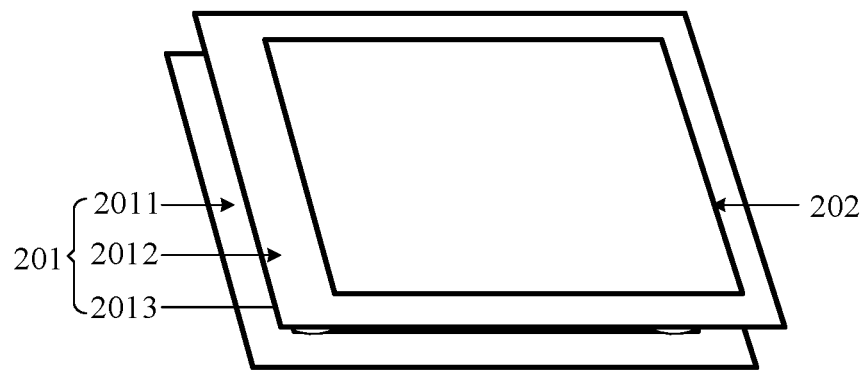
FIG. 6 is a structural schematic diagram of a light modulation mirror provided by an embodiment of the present application.

As shown in FIG. 6, FIG. 6 is a schematic diagram of a light modulation unit provided in the embodiment of the present application. The drive assembly 201 in the light modulation unit 200a may include: a first substrate 2011 and a second substrate 2012 which are oppositely arranged, and a drive structure 2013 between the first substrate 2011 and the second substrate 2012. The light modulation mirror 202 can be located on one side of the second substrate 2012 far from the first substrate 2011, the light modulation mirror 202 can be stacked on the second substrate 2012, and the reflecting surface of the light modulation mirror 202 is located on one side far from the second substrate 2012. The drive structure 2013 is configured for driving the second substrate 2012 to move in the direction perpendicular to the second substrate 2012, so as to drive the light modulation mirror 202 to move in the direction perpendicular to the light modulation mirror 202.

Figure 7:
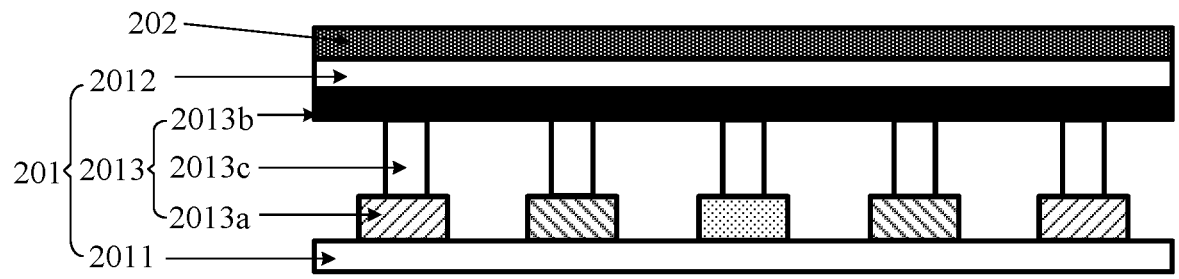
FIG. 7 is a side view of a drive assembly shown in FIG. 6.

In the embodiment of the present application, as shown in FIG. 7, FIG. 7 is a side view of the drive assembly shown in FIG. 6. The drive structure 2013 can include at least one drive electrode 2013a on one side of the first substrate 2011 close to the second substrate 2012, a common electrode 2013b on one side of the second substrate 2012 close to the first substrate 2011, and a plurality of elastic supports 2013c between the first substrate 2011 and the second substrate 2012.

It should be noted that the first substrate 2011 among the plurality of light modulation units 200a in the light modulation device 200 is multiplexed, that is, the plurality of first substrates 2011 of the plurality of light modulation units 200a are a whole substrate.

One end of each elastic support 2013c can be fixedly connected with the drive electrode 2013a and the other end can be fixedly connected with the common electrode 2013b.

It should be noted that when at least one drive electrode 2013a on the first substrate 2011 close to the second substrate 2012 includes a plurality of drive electrodes 2013a, there is a gap between any two of the plurality of drive electrodes 2013a.

In this application, the common electrode 2013b set on one side of the second substrate 2012 close to the first substrate 2011 can be a plate electrode, and the common electrode 2013b can always be loaded with a voltage of 0 volt, that is, the common electrode 2013b is grounded.

At least one drive electrode 2013a arranged on one side of the first substrate 2011 close to the second substrate 2012 is configured for adjusting the distance between the first substrate 2011 and the second substrate 2012 by loading each drive electrode 2013a with the same voltage as the common electrode 2013b, or with a voltage different from the common electrode 2013b, so that the position of the light modulation mirror 202 on one side of the second substrate 2012 far from the first substrate 2011 can be adjusted.

In an implementation, the drive structure 2013 in the embodiment of the present application can also include: a drive circuit connecting with each drive electrode 2013a (not shown in FIGS. 6 and 7). The drive circuit is configured for applying the same voltage as or different from the common electrode 2013b to the drive electrode 2013a. For example, the drive circuit includes a power supply end and a drive transistor between the power supply end and the drive electrode 2013a. When the drive transistor is turned on, the power supply end can apply voltage to the drive electrode 2013a, at this time, the drive electrode 2013a is loaded with a voltage different from the common electrode 2013b. When the drive transistor is turned off, the power supply end cannot apply voltage to the drive electrode 2013a, at this time, the drive electrode 2013a is loaded with the same voltage as the common electrode 2013b, that is, the 0 volt voltage.

In the embodiment of the application, when the drive electrode 2013a is loaded with a voltage different from the common electrode 2013b, a voltage difference will be formed between the drive electrode 2013a and the common electrode 2013b, so that an electric adsorption force will be generated between the first substrate 2011 and the second substrate 2012. Under the action of the electric adsorption force, the second substrate 2012 can be driven to move in the direction perpendicular to the second substrate 2012 so as to adjust the distance between the first substrate 2011 and the second substrate 2012.

It should be noted that during the movement of the second substrate 2012 in the direction perpendicular to the second substrate 2012, a plurality of elastic supports 2013c between the first substrate 2011 and the second substrate 2012 need to be stretched or shrunk.

It should also be noted that the magnitude of the electric adsorption force generated between the first substrate 2011 and the second substrate 2012 is related to the area of the drive electrode 2013a (the drive electrode 2013a needs to be loaded with a voltage different from the common electrode 2013b). Therefore, by setting a plurality of drive electrodes 2013a on one side of the first substrate 2011 close to the second substrate 2012, it is possible to generate a variety of position relationships between the first substrate 2011 and the second substrate 2012, so that the light modulation mirror 202 on one side of the second substrate 2012 far from the first substrate 2011 can be located at a variety of different positions, thus effectively improving the accuracy of the light modulation device 200 in modulating the illumination beam.

Figure 8:
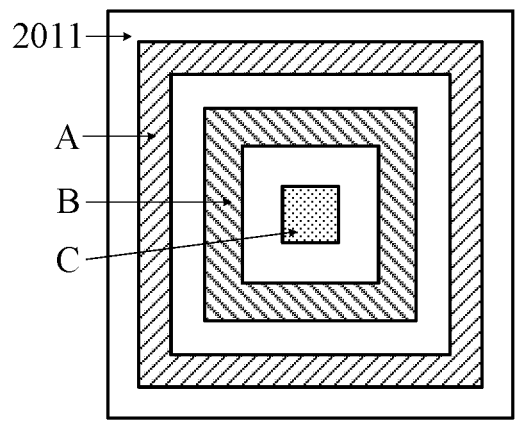
FIG. 8 is a top view of a first substrate provided by an embodiment of the present application.

For example, FIG. 8 is a top view of the first substrate provided in the embodiment of the application. As shown in FIG. 8, at least one drive electrode 2013a on one side of the first substrate 2011 close to the second substrate 2012 can include a plurality of nested circular drive electrodes and a plate-shaped drive electrode located in the central area of the plurality of circular drive electrodes. In this way, the area of each drive electrode on the side of the first substrate 2011 close to the second substrate 2012 is different. After applying voltage to different drive electrodes 2013a on one side of the first substrate 2011 close to the second substrate 2012 (that is, a voltage different from that of the common electrode 2013b), a variety of electric adsorption forces with different magnitudes can be generated between the first substrate 2011 and the second substrate 2012, accordingly, the distance between the first substrate 2011 and the second substrate 2012 can be different, that is, a variety of position relationships can be generated between the first substrate 2011 and the second substrate 2012.

For example, at least one drive electrode 2013a on one side of the first substrate 2011 close to the second substrate 2012 can include: a drive electrode A, a drive electrode B and a drive electrode C. The drive electrode A and the drive electrode B can be circular drive electrodes, and the drive electrode C can be a plate-shaped drive electrode located in the central area of the circular drive electrode. After the respective drive electrodes of the drive electrode A, the drive electrode B and the drive electrode C are loaded with a voltage (the same voltage as the common electrode 2013b or different voltage from the common electrode 2013b), the distance between the first substrate 2011 and the second substrate 2012 can be different. For example, please refer to Table 1, which is a correspondence table of the distance between the first substrate 2011 and the second substrate 2012 after the drive electrodes of the drive electrode A, the drive electrode B and the drive electrode C are loaded with a voltage.

TABLE 1

| Drive electrode A | Drive electrode B | Drive electrode C | Distance between first substrate and second substrate |
|---|---|---|---|
| 0 | 0 | 0 | L1 |
| V | 0 | 0 | L2 |
| 0 | V | 0 | L3 |
| 0 | 0 | V | L4 |
| V | V | 0 | L5 |
| V | 0 | V | L6 |
| 0 | V | V | L7 |
| V | V | V | L8 |

As shown in Table 1, when the drive electrode is loaded with a voltage of 0 volt, i.e. the drive electrode is loaded with the same voltage as the common electrode 2013b; when the drive electrode is loaded with a voltage of V volts, i.e. the drive electrode is loaded with a voltage different from the common electrode 2013b. For example, when the drive electrode A, the drive electrode B and the drive electrode C are all loaded with a voltage of 0 volt, the distance between the first substrate 2011 and the second substrate 2012 is L1; and when the drive electrode A is loaded with a voltage of V volts, and the drive electrode B and the drive electrode C are both loaded with a voltage of 0 volt, the distance between the first substrate 2011 and the second substrate 2012 is L2.

According to the Table 1, when three drive electrodes are set on one side of the first substrate 2011 close to the second substrate 2012, eight position relationships can be generated between the first substrate 2011 and the second substrate 2012. In this way, the light modulation mirror 202 on one side of the second substrate 2012 far from the first substrate 2011 can be located at eight different positions.

In the embodiment of the application, as shown in FIGS. 3 and 4, the circular drive electrode in the at least one drive electrode 2013a arranged on the side of the first substrate 2011 close to the second substrate 2012 can be a rectangular annular drive electrode, and the plate-shaped drive electrode in at least one drive electrode 2013a can be a rectangular plate-shaped drive electrode. For the rectangular circular drive electrode, four elastic supports 2013 are required to be connected with the rectangular circular drive electrode. The four elastic supports 2013 are respectively located at the four top corners of the rectangular circular drive electrode. For the rectangular plate-shaped drive electrode, one elastic support 2013 is required to be connected with the rectangular plate-shaped drive electrode. The elastic support 2013 can be located in the central area of the rectangular plate-shaped drive electrode.

It should be noted that in the above embodiment, the drive assembly 201 in the light modulation device 200 controls the light modulation mirror 202 to move in the direction perpendicular to the reflecting surface of the light modulation mirror 202 so as to adjust the phase of the light rays in the illumination beams.

The light modulation device can also modulate the image beam of the illumination beam, and the implementation content of this part is similar to the modulation working principle of the laser valve in the prior art.

For example, in the DLP projection architecture, the DMD digital micro-mirror array surface has thousands of micro mirrors, which can be controlled to perform positive and negative deflection angle and duration integration for the three primary colors to achieve the display of color images.

In the application, the operation process of the light modulation device is similar to the operation mode of the DMD digital micro-mirror array.

Figure 2C:
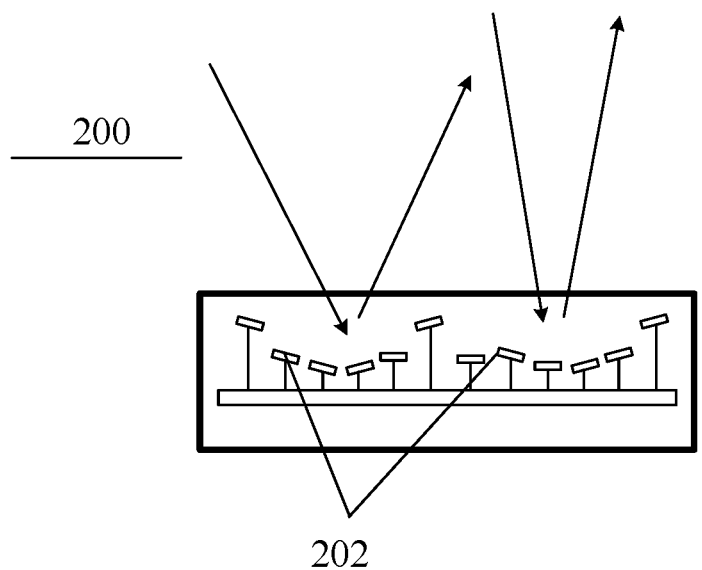
FIG. 2C is another side structural diagram of the light modulation device provided by an embodiment of the present application.

As shown in FIG. 2C, the light modulation device 200 can not only realize that different modulation partitions have different light-reflecting surfaces, but also realize the deflection of each light modulation mirror. Specifically, when the light modulation mirror is deflected, a coil drive structure can be set between the first substrate and the second substrate to realize the change of the included angle of the second substrate relative to the plane of the first substrate by alternating current. Specifically, the second substrate can be driven to rotate around a side or diagonal direction of the second substrate.

Specifically, taking the first modulation partition and the second modulation partition as examples, the light modulation device 200 is also configured for adjusting the deflection angles of respective light modulation mirrors in the corresponding first modulation partition through the respective drive assemblies in the first modulation partition. When the respective light modulation mirrors are at the first deflection angle, the beams reflected by the respective light modulation mirrors can be projected into the projection lens. When the respective light modulation mirrors are at the second deflection angle, the beams reflected by the respective light modulation mirrors cannot enter the projection lens.

The first deflection angle and the second deflection angle may be alternated in sequence or may be maintained for a period of time before alternating.

Figure 11B:
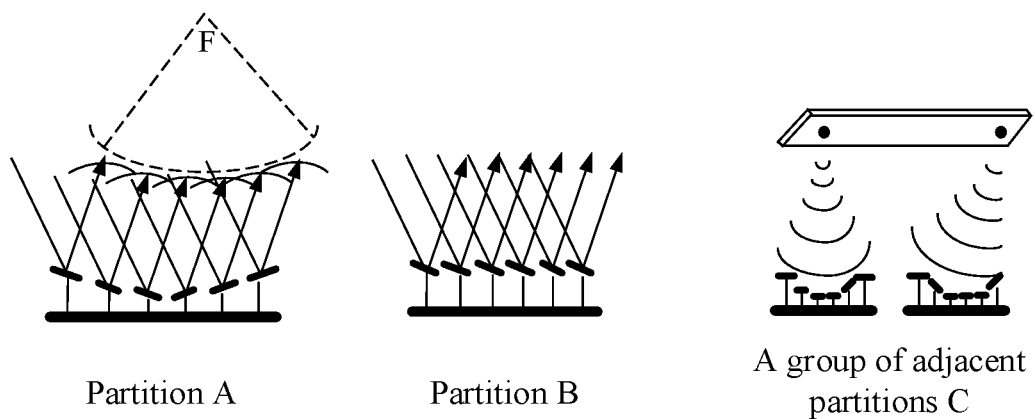
FIG. 11B is a schematic diagram of another operation state of the light modulation device provided by an embodiment of the present application.

Also, referring to FIG. 11B, another working state diagram of different partitions of the light modulation device is shown.

As shown in FIG. 11B, not only are the high and low positions of the plurality of light modulation units in a partition A of the left figure different, but also the reflecting surface of the light modulation mirror of each light modulation unit deflects, which not only forms that different partitions have different reflecting surface types, but also enables the beam at a deflection angle to be projected into the projection lens as an effective beam for imaging.

In the partition B of the middle figure of the FIG. 11B, all the light modulation units have the same height, and all the light modulation units are deflected in one direction.

In a group of adjacent partitions C in the right figure of the FIG. 11B, the two adjacent modulation partitions realize different reflecting surface types in different partitions by moving the light modulation units to different heights and deflecting the angles of the reflecting surfaces of the light modulation mirrors. The optical paths of the illumination beams incident on the modulation partitions can be changed, and then phase modulation is performed to influence light intensity distribution. Besides, through control of the deflection angle, the light modulation mirrors can cooperate with the projection lens to achieve the entry of effective beams and the discarding of invalid beams.

In many embodiments of the present application, the source 100 may include a laser, a fluorescent wheel, a color filter wheel, a reflection assembly, and the like. The laser can be a blue laser. After the blue laser emits blue light, red light and green light are generated through the fluorescent wheel. Next, the blue light, red light and green light can be reflected to the light modulation device 200 through the reflection assembly after passing through the color filter wheel.

The light modulation device 200 is located in a light mechanical part. The light mechanical part may also include a light adjustment assembly, a prism assembly, and the like. The light adjustment assembly can receive the illumination beams provided by the source 100 and the illumination beams are incident to the prism assembly; the prism assembly can receive the illumination beams emitted from the light adjustment assembly, and emit the illumination beams emitted from the light adjustment assembly to the light receiving surface of the light modulation device.

In some embodiments, the number of image partitions of the image to be projected is less than or equal to the resolution in the light modulation device 200. The more the image partitions are, the finer the image contrast will be, and the effect will be more natural and obvious.

The projection lens 300 may include a plurality of lens groups, and each lens group may be composed of a convex lens, a concave lens and other lenses. Through the plurality of lens groups, it is possible to project the illumination beams with an image signal modulated by the light modulation device 200 into an image.

To sum up, the laser projection apparatus provided by the embodiment of the application includes a source, a light modulation device and a projection lens. The light modulation device can not only adjust the light intensity distribution of the illumination beam provided by the source based on the image brightness signal of the image to be projected, so that the light intensities in at least two beam partitions of the illumination beam modulated by the light modulation device are different, but also can modulate the image beam based on the image component signal of the image to be projected, and can project to achieve the presentation of a color picture. The projection picture thus projected can enlarge the difference between the brightness of at least two image partitions corresponding to the at least two beam partitions in the image to be projected, so that the dynamic contrast of the image to be projected can be improved without changing the luminous brightness of the source and without processing the image to be projected.

In some embodiments, the image brightness signal of the image to be projected can be acquired first in real time, and the image partitions and brightness adjustment signal can be output to the light modulation device, as well as the image component signal of the image to be projected, that is, the RGB three primary color component image signal can also be converted into the drive signal of the light modulation device, so as to drive the light modulation device to modulate the illumination beam according to these two types of signals to generate the image beam, and finally, the image beam is projected into a projection picture, which can realize real-time adjustment of the contrast of the projected image and improve the display effect of the projected image.

In other embodiments, the brightness signal of one or more frames of the image to be projected can also be acquired at the same time and then partitioning is performed accordingly. Correspondingly, the light modulation device can also perform partitioning accordingly to achieve the change of the beam brightness of different partitions. In this way, after the current image is projected, the image partitions and brightness change signal of the previous frame or several frames can be used continuously due to the small change of the images of consecutive frames. Therefore, the contrast change of the projected image is applied to the subsequent image to be projected, and the display effect of the subsequent image to be projected through the projection lens can also be improved.

Figure 9:
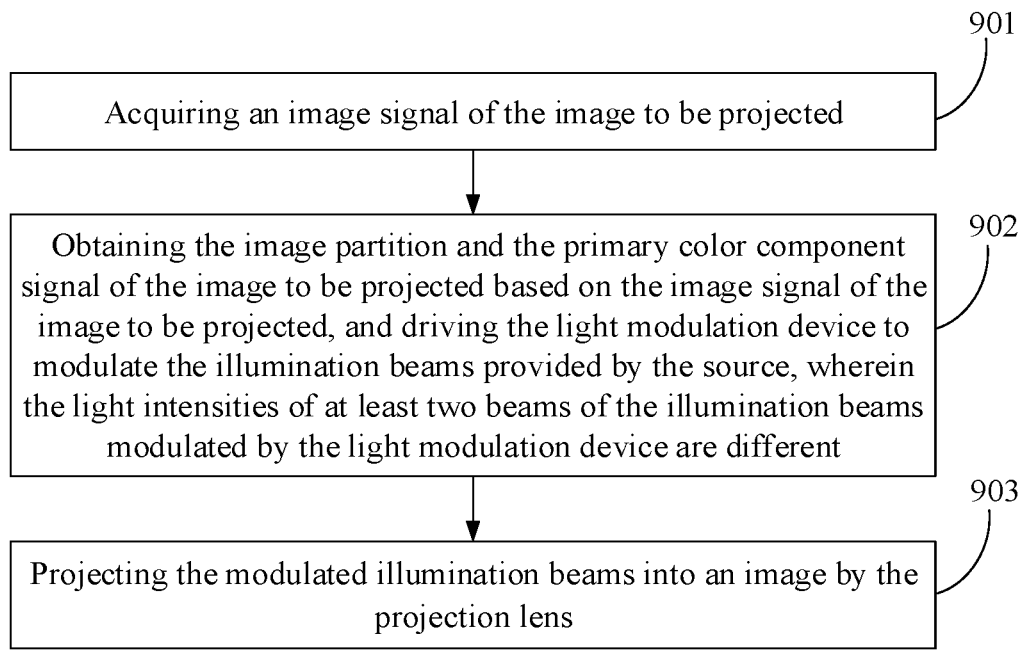
FIG. 9 is a flowchart of a projection display method of the laser projection apparatus provided by an embodiment of the present application.

The embodiment of the application also provides a projection display method of the laser projection apparatus, as shown in FIG. 9, which is a flowchart of the projection display method of the laser projection apparatus provided in the embodiment of the application. The projection display method is applied to the laser projection apparatus 00 shown in FIG. 1A. The projection display method may include the following steps.

Step 901, an image signal of an image to be projected is acquired.

In the embodiments of the application, the FPGA or the control processing module in the laser projection apparatus can acquire the image signal of the image to be projected.

Step 902, the image partition and the primary color component signal of the image to be projected are obtained based on the image signal of the image to be projected, and the light modulation device is driven to modulate the illumination beams provided by the source, wherein the light intensities of at least two beams of the illumination beams modulated by the light modulation device are different.

In the embodiments of the application, the FPGA or the control processing module in the laser projection apparatus can obtain the image signal of the image to be projected, and analyze or decompose the image signal to obtain the image partitions and the three primary color image component signal.

Specifically, the light modulation device is also provided with a plurality of modulation partitions corresponding to the image partitions of the image to be projected. Each modulation partition receives the illumination of illumination beams, and the surface types of the reflecting surfaces of at least two modulation partitions are different, so that changes of the light intensities of the illumination beams corresponding to different modulation partitions are different, thus the distribution of the illumination beams can be influenced and can correspond to the light intensity distribution of different partitions on the projected image picture.

Step 903, the projection lens projects the modulated illumination beams into the image.

In the projection display method of the laser projection apparatus provided by the embodiment of the application, the brightness signal image component signal of the image to be projected is obtained, converted into a drive signal and output to the light modulation device, and the light modulation device is driven to modulate the illumination beams provided by the source. In this way, on one hand, the projection display of the projected image can be completed; on the other hand, the light intensities in at least two beam partitions of the beams modulated by the light modulation device are different, so that the difference between the brightness of at least two image partitions corresponding to the at least two beam partitions in the image to be projected can be expanded, thus, the dynamic contrast of the image to be projected can be improved without changing the luminous brightness of the source and without processing the image to be projected, so as to improve the display effect of the image to be projected subsequently projected through the projection lens.

Figure 10:
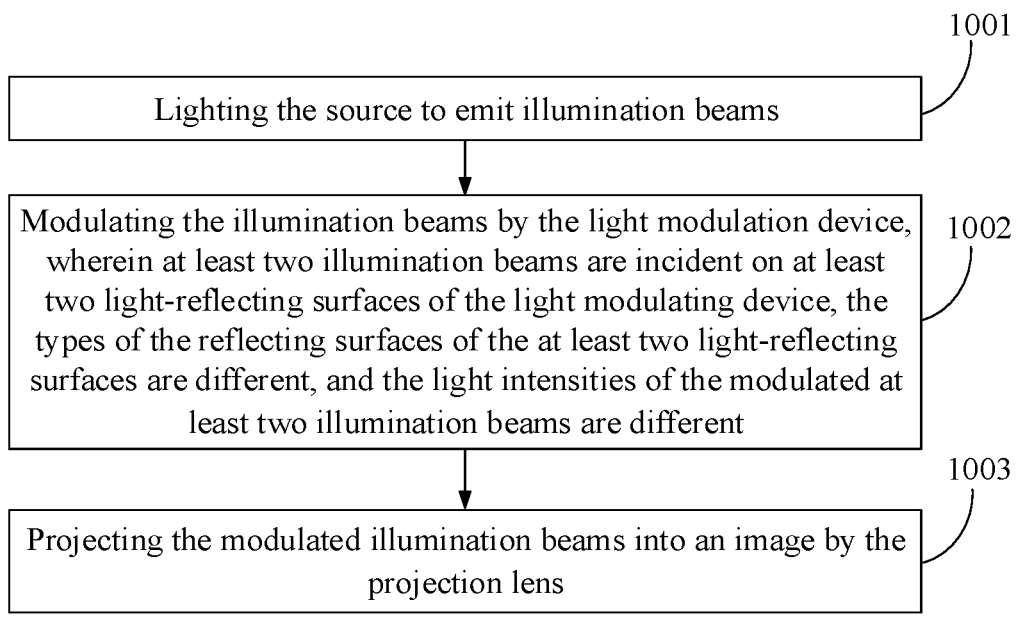
FIG. 10 is a flowchart of another projection display method of the laser projection apparatus provided by an embodiment of the present application.

Please refer to FIG. 10, which is a flowchart of the projection display method of the other laser projection apparatus provided in the embodiment of the application. The projection display method is applied to the laser projection apparatus 00 shown in FIG. 1A. The projection display method may include the following steps.

Step 1001, the source is lit to emit illumination beams.

In combination with the laser projection apparatus shown in FIG. 1A and FIG. 1B, the source 100 is controlled by the control processing module 10 and is driven to light up in coordination with the sequence displayed by the image.

Step 1002, the light modulation device modulates the illumination beams, wherein at least two illumination beams are incident on at least two light-reflecting surfaces of the light modulating device, the types of the reflecting surfaces of the at least two light-reflecting surfaces are different, and the light intensities of the modulated at least two illumination beams are different.

In the implementations of the present application, the light modulation device includes a plurality of light modulation units, each light modulation unit includes a light modulation mirror and a drive assembly, the drive assembly is configured for driving the corresponding light modulation mirror to move in a direction perpendicular to the reflecting surface of the light modulation mirror and also for driving the reflecting surface of the light modulation mirror to generate angle deflection. The combination of the above actions can form different reflecting surface types in at least two light reflecting surface areas. Different reflecting surface types make the treatment of the illumination beams incident on the reflecting surface different. Specifically, the optical path of the plurality of light rays of the illumination beam changes, and the reflection angles are different.

The image to be projected has at least two image partitions, which can correspond one-to-one with at least two beam partitions in the lighting beam provided by the source. By adjusting the position of each light modulation mirror in the light modulation device in the direction perpendicular to the reflecting surface of the light modulation mirror, different reflecting surface types are formed, so that the phase of at least part of light rays of the beams reflected by each light modulation mirror in the light modulation device is different, and the light intensity distribution is also changed.

In the embodiments of the application, the control unit in the laser projection apparatus can adjust the reflecting surface type of each light modulation partition of the light modulation device based on the brightness signal of each image partition in the image to be projected, so that the phase of at least part of light rays of the beams reflected by each light modulation mirror in the light modulation device is different. In this way, in the beams reflected by each light modulation mirror in the light modulation device, there can be coherent interference of the light rays in one beam partition, and destructive interference of the light rays in the other beam partition, making the light intensities of the two beam partitions different. When the light intensity of the first beam partition is greater than that of the second beam partition, the light rays in the first beam partition subsequently pass through the light modulation device 200 and the projection lens, and the brightness of the first image partition converted is brighter; the light rays in the second beam partition subsequently pass through the light modulation device 200 and the projection lens, and the brightness of the second image partition converted is darker, thus, the dynamic contrast of the image to be projected is effectively improved.

Furthermore, the control unit in the laser projection apparatus can control the deflection angle and duration of each light modulation mirror based on the three primary color image component signal in the image to be projected, so as to realize the modulation of the image beam.

As an example, reference may be made to schematic diagrams of phase changes of different partitions of the light modulation device for the corresponding beams of the partitions shown in FIGS. 11A and 11B. Reference is made to the above-mentioned embodiments for specific description and the specific description will not be repeated in detail.

Step 1003, the projection lens projects the modulated illumination beams into an image.

In the embodiments of the present application, the projection lens projects the illumination beam modulated by the light modulating device into an image.

It should be noted that the working principle and structure of each component in the laser projection apparatus described above can refer to the aforementioned embodiment of the structure description of the laser projection apparatus. The embodiment of the application will not be repeated here.

To sum up, the projection display method of the laser projection apparatus provided by the embodiment of the application modulates the illumination beams provided by the source through the light modulation device, so that the light intensities in at least two beam partitions of the illumination beams modulated by the light modulation device are different. In this way, the difference between the brightness of at least two image partitions corresponding to the at least two beam partitions in the image to be projected can be expanded, so that the dynamic contrast of the image to be projected can be improved without changing the luminous brightness of the source and without processing the image to be projected, and thus the display effect of the image to be projected subsequently projected through the projection lens can be improved.

Figure 12:
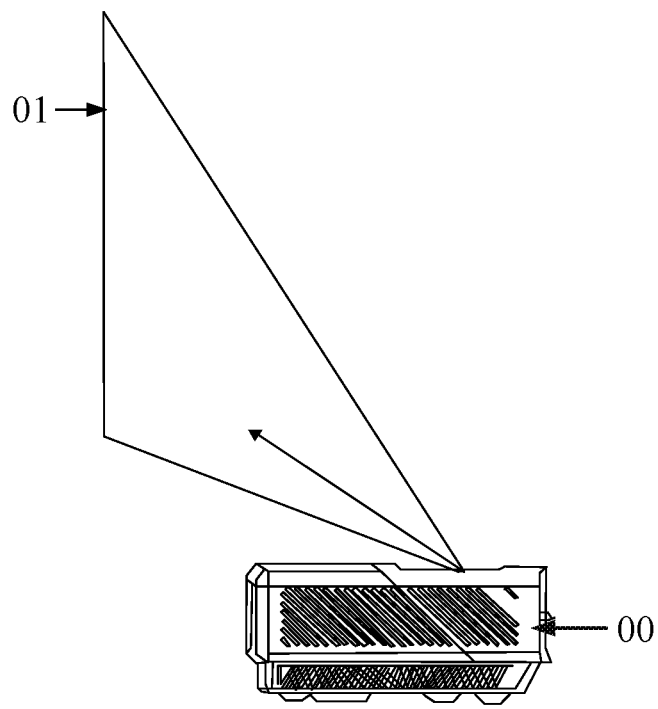
FIG. 12 is another structural schematic diagram of the laser projection apparatus provided by an embodiment of the present application.

The embodiments of the application also provides a laser projection television, as shown in FIG. 12, which is the structural diagram of the laser projection apparatus provided in the embodiments of the application. The laser projection television may include a laser projection apparatus -00 and a projection screen 01. The laser projection apparatus 00 may be the laser projection apparatus shown in FIG. 1. The image projected by the projection lens 300 in the laser projection apparatus 00 is located in the projection screen 01.

Figure 1C:
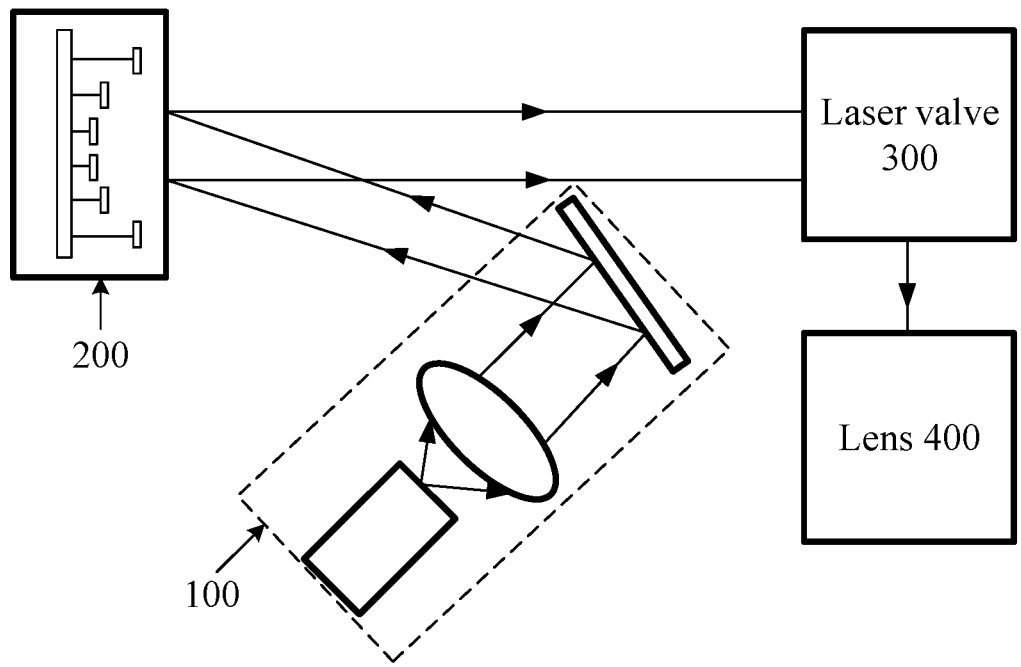
FIG. 1C is a structural schematic diagram of another laser projection apparatus provided by an embodiment of the present application.

Referring to FIG. 1C, the embodiment of the present application provides a structural schematic diagram of another laser projection apparatus. The laser projection apparatus 00 includes a source 100, a spatial dimming device 200, a laser valve 300, and a lens 400.

The source 100 is configured for providing a plurality of illumination beams, and the illumination beams are directed to the spatial dimming device 200.

The spatial dimming device 200 is configured for dimming the illumination beams provided by the source 100 based on image information of an image to be projected, so that light intensities of at least part of the illumination beams after dimming by the spatial dimming device 200 are different.

The laser valve 300 is configured for modulating the illumination beams dimmed by the spatial dimming device 200 based on the image information of the image to be projected.

The laser valve 300 includes a light adjusting component, a prism component, a DMD light valve, etc.

The light adjusting component is configured for receiving the illumination beams dimmed by the spatial dimming device 200, and transmitting the illumination beams to the prism component.

The prism component is configured for receiving the illumination beams from the light adjusting component, and transmitting the illumination beams from the light adjusting component to a light receiving surface of the DMD light valve after twice reflection.

The DMD light valve is configured for modulating the illumination beams from the prism component based on an image signal, and reflecting the modulated illumination beams to the lens.

Optionally, a resolution of a mirror in the spatial dimming device 200 is less than or equal to a resolution of a mirror in the DMD light valve in the laser valve 300. That is, the number of mirrors in the spatial dimming device 200 is less than or equal to the number of mirrors in the DMD light valve in the laser valve 300.

The lens 400 is configured for projecting and imaging the illumination beams modulated by the laser valve 300.

Figure 13:
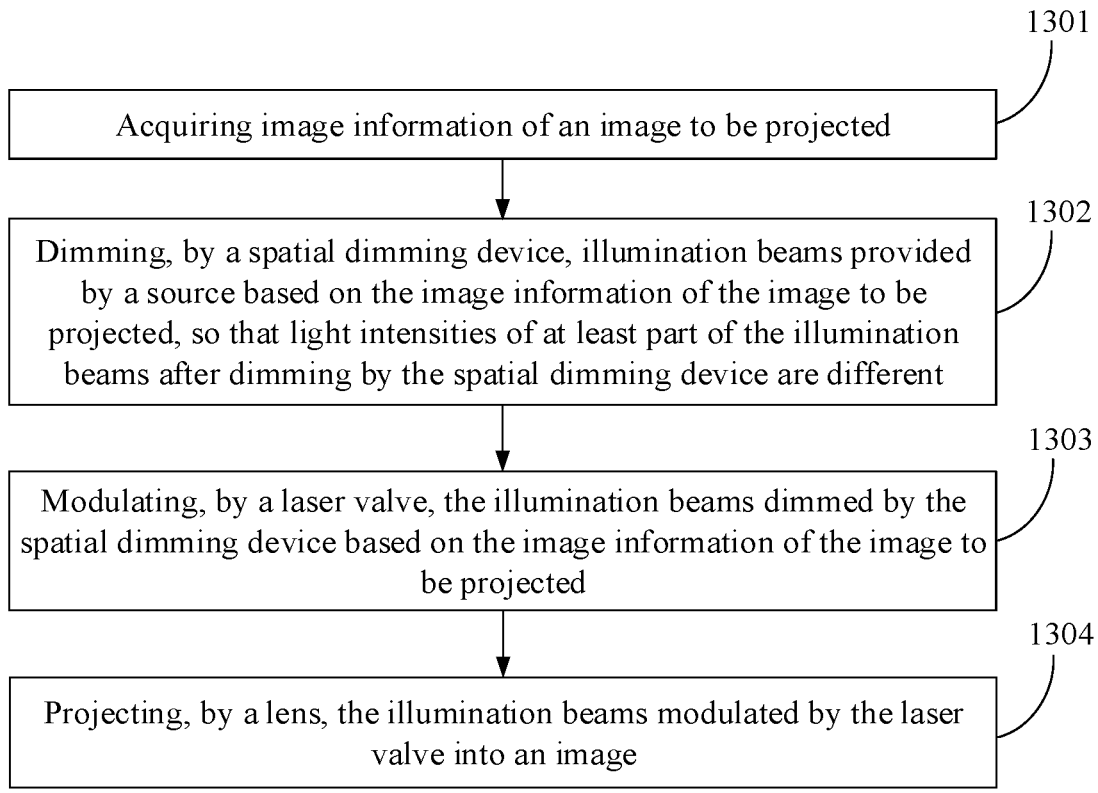
FIG. 13 is a flowchart of another projection display method of the laser projection apparatus provided by an embodiment of the present application.

Based on the laser projection apparatus shown in FIG. 1C, the embodiment of the present application further provides another projection display method of the laser projection apparatus. Referring to FIG. 13, the projection method includes the following operations.

Step 1301, acquiring image information of an image to be projected.

Step 1302, dimming, by a spatial dimming device, illumination beams provided by a source based on the image information of the image to be projected, so that light intensities of at least part of the illumination beams after dimming by the spatial dimming device are different.

Step 1303, modulating, by a laser valve, the illumination beams dimmed by the spatial dimming device based on the image information of the image to be projected.

Step 1304, projecting, by a lens, the illumination beams modulated by the laser valve into an image.

In the above embodiments of the present application, the spatial dimming device and the laser valve are independent, the spatial dimming device is configured for dimming and beams redistribution, and the laser valve is configured for light modulation through deflection angle.

In this application, the terms "first" and "second" are only configured for describing purposes and cannot be understood as indicating or implying relative importance. The term "a plurality" refers to two or more, unless otherwise expressly defined.

The above is only an embodiment of the application in one implementation and does not limit the application. Any modification, equivalent replacement, improvement, etc. made within the spirit and principles of the application shall be included in the protection scope of the application.

What is claimed is:

1. A laser projection apparatus, comprising:
   a source, configured for providing a plurality of illumination beams;
   a dimming system, configured for performing beam shaping and modulating for the plurality of illumination beams, wherein at least two illumination beams of the plurality of illumination beams after being modulated are of different light intensities; and
   a projection lens, configured for projecting the plurality of illumination beams after being modulated into an image;
   wherein the dimming system comprises:
   a light modulation device, comprising at least two light-reflecting surfaces having different light-reflecting surface types, wherein the plurality of illumination beams are incident on the at least two light-reflecting surfaces to generate the at least two illumination beams having different light intensities.

2. The laser projection apparatus according to claim 1, wherein the light-reflecting surface types include concave or convex.

3. The laser projection apparatus according to claim 1, wherein,
   the light modulation device comprises a plurality of light modulation units, each light modulation unit comprises a light modulation mirror and a drive assembly, the drive assembly is configured for driving the corresponding light modulation mirror to move in a direction perpendicular to a reflecting surface of the light modulation mirror and configured for driving the reflecting surface of the light modulation mirror to deflect an angle.

4. The laser projection apparatus according to claim 3, wherein the drive assembly comprises a first substrate and a second substrate which are oppositely disposed and a drive structure arranged between the first substrate and the second substrate; and
   the light modulation mirror is located on a side of the second substrate away from the first substrate.

5. The laser projection apparatus according to claim 4, wherein the drive structure is configured for driving the second substrate to move in a direction perpendicular to the second substrate.

6. The laser projection apparatus according to claim 4, wherein the driving structure is configured for driving the second substrate to rotate around a side or a diagonal direction of the second substrate.

7. The laser projection apparatus according to claim 4, wherein the drive structure is configured for driving the second substrate to move in a direction perpendicular to the second substrate and driving the second substrate to rotate around a side or a diagonal direction of the second substrate.

8. The laser projection apparatus according to claim 3, wherein,
   the plurality of light modulation units in the light modulation device are arrayed in a plurality of rows and a plurality of columns.

9. The laser projection apparatus according to claim 1, wherein,
   the light modulation device is configured for controlling a position at which the light modulation mirror is moved in a direction perpendicular to the reflecting surface of the light modulation mirror according to one or more brightness signals of an image to be projected; and
   the light modulation device is configured for controlling a deflection of the light modulation mirror according to one or more component signals of the image to be projected.

10. The laser projection apparatus according to claim 9, wherein,
    the one or more brightness signals of the image to be projected comprises: one or more image partitions of an image; and
    the one or more component signals of the image to be projected comprises an R component image signal of the image, a G component image signal of the image and a B component image signal of the image.

11. The laser projection apparatus according to claim 10, wherein,
    the light modulation device has a corresponding light modulation partition corresponding to each of the one or more image partitions, each light modulation partition comprises at least one light modulation unit, and each light modulation partition corresponds to one illumination beam and has a light reflecting surface.

12. The laser projection apparatus according to claim 11, wherein the light modulation device has at least a first light modulation partition and a second light modulation partition,
    the light modulation device is further configured for adjusting, by each drive assembly within the first light modulation partition, a height position of each light modulation mirror within the first light modulation partition to cause interference of at least part of light rays of beams reflected by the light modulation mirror within the first light modulation partition;
    the light modulation device is further configured for adjusting, by each drive assembly within the second light modulation partition, a height position of each light modulation mirror within the second light modulation partition to cause interference of at least part of light rays of beams reflected by the light modulation mirror within the second light modulation partition; and
    a light intensity of the beams reflected by the first light modulation partition is different from a light intensity of the beams reflected by the second light modulation partition.

13. The laser projection apparatus according to claim 12, wherein the light modulation device is further configured for adjusting, by each drive assembly within the first light modulation partition, a deflection angle of each light modulation mirror within the first light modulation partition, beams reflected by each light modulation mirror are projected into projection lens when each light modulation mirror is at a first deflection angle; and
    when each light modulation mirror is at a second deflection angle, the beams reflected by each light modulation mirror are not projected into the projection lens.

14. The laser projection apparatus according to claim 11, wherein the light modulation device has at least a first light modulation partition and a second light modulation partition,
    the light modulation device is further configured for adjusting, by each drive assembly within the first light modulation partition, a deflection angle of each light modulation mirror within the first light modulation partition, beams reflected by each light modulation mirror are projected into projection lens when each light modulation mirror is at a first deflection angle; and when each light modulation mirror is at a second deflection angle, the beams reflected by each light modulation mirror are not projected into the projection lens.

15. The laser projection apparatus according to claim 1, wherein, the laser projection apparatus further comprises a control unit configured for processing an input video image signal to obtain one or more brightness signals of an image to be projected and one or more component signals of the image to be projected, the one or more brightness signals of the image to be projected and the one or more component signals of the image to be projected are sequentially transmitted to the light modulation device.

16. The laser projection apparatus according to claim 1, further comprising:

a control unit, configured for converting an input video image signal into multiple drive signals of the light modulation device, and the multiple drive signals are associated with one or more brightness signals of the image to be projected and one or more component signals of the image to be projected.

17. A laser projection display method, applied to a laser projection apparatus comprising a source, a dimming system and a projection lens, and the method comprising:

emitting, by the source, a plurality of illumination beams;

performing beam shaping and modulating, by the dimming system, for the plurality of illumination beams, wherein at least two illumination beams of the plurality of illumination beams after being modulated are of different light intensities; and projecting, by the projection lens, the plurality of illumination beams after being modulated into an image;

wherein the dimming system comprises:

a light modulation device, comprising at least two light-reflecting surfaces having different light-reflecting surface types, wherein the plurality of illumination beams are incident on the at least two light-reflecting surfaces to generate the at least two illumination beams having different light intensities.

18. The method according to claim 17, wherein the light modulation device comprises a plurality of light modulation units, each light modulation unit comprises a light modulation mirror and a drive assembly, and the method further comprises:

driving, by the drive assembly, a corresponding light modulation mirror to move in a direction perpendicular to a reflecting surface of the light modulation mirror; and driving, by the driving assembly, the reflecting surface of the light modulation mirror to deflect an angle.

* * * * *